R. E. EHRGOTT.
DIRIGIBLE MOTOR VEHICLE HEADLIGHT.
APPLICATION FILED OCT. 2, 1917.
1,267,994.
Patented May 28, 1918.
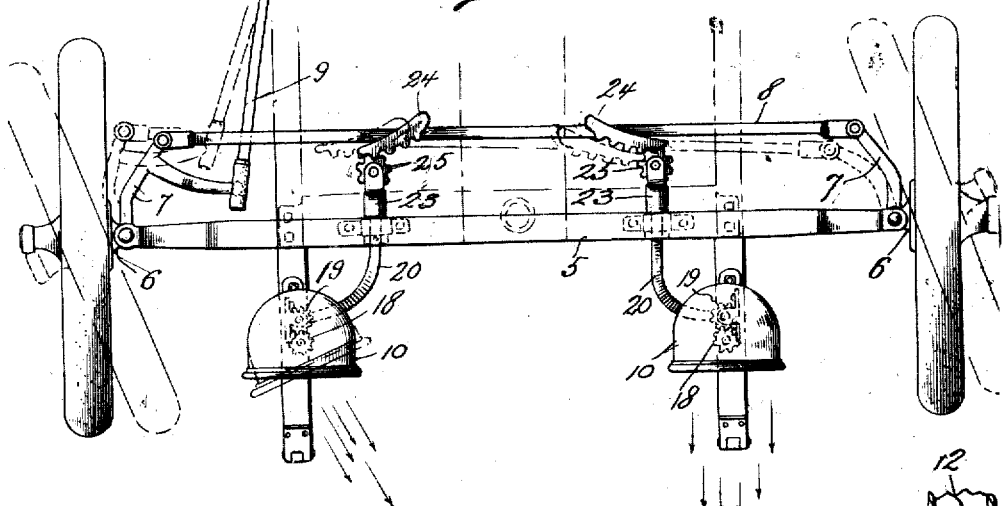
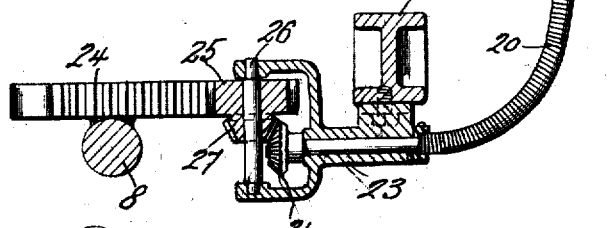
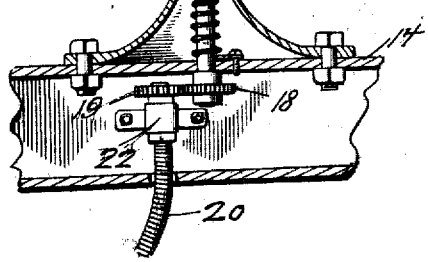
Inventor
Roberts E. Ehrgott

UNITED STATES PATENT OFFICE.

ROBERTS E. EHRGOTT, OF CHICAGO, ILLINOIS.

DIRIGIBLE MOTOR-VEHICLE HEADLIGHT.

1,267,994. Specification of Letters Patent. Patented May 28, 1918.

Application filed October 2, 1917. Serial No. 194,339.

*To all whom it may concern:*

Be it known that I, ROBERTS E. EHRGOTT, a citizen of the United States, residing at Chicago, in the county of Cook and State of Illinois, have invented new and useful Improvements in Dirigible Motor-Vehicle Headlights, of which the following is a specification.

This invention relates to headlights for motor vehicles which are dirigible, to follow turns or curves in the road along which the vehicle may be traveling, the headlights being provided with a support in which they are free to turn sidewise, and a connection being provided between the headlights and the steering mechanism of the car, so arranged that when said mechanism moves to steer the car around a curve, one of the headlights turns to throw a beam of light sidewise to light up the road ahead, the other headlight remaining stationary to direct its beams straight ahead.

The invention has for its object to provide a simple and efficient headlight controlling means of the kind stated, and to this end the invention consists in a novel combination and arrangement of parts to be hereinafter described and claimed.

In order that the invention may be better understood, reference is had to the accompanying drawing forming a part of this specification, and in said drawing, Figure 1 is a plan view showing the application of the invention;

Fig. 2 is a sectional detail of a lamp support, and Fig. 3 is an elevation, partly in section, of the lamp turning mechanism.

Referring specifically to the drawing 5 denotes the front axle of a motor vehicle carrying the usual pivoted spindles 6 at its ends, which latter have outstanding arms 7 connected by a rod 8. To one of the spindle arms 7 is connected a rod 9 having a suitable connection with the steering gear of the car. When the steering gear connecting rod 9 is operated, both spindles 6 are turned simultaneously through the spindle connecting rod 8. This is a well-known form of steering mechanism, and a further description thereof is not deemed necessary, especially as it forms no part of the present invention. The rod 8 has a movement in the direction of its length, parallel to the axle 5, and it also moves laterally of the axle or toward and from the same when it is operated to swing the spindles 6.

Each headlight 10 of the car is carried by a fork 11 having a depending stem 12 which is rotatably supported in a tubular standard 13 supported on and fastened to any convenient portion 14 of the chassis. The stem 12 projects from the upper end of the standard and it is here enlarged in diameter and formed with a step or shoulder 15 which is opposite a similar step 16 on the top of the standard. When the headlight is in straight-ahead position, these shoulders abut. A spring 17 is coiled around and connected to the stem 12 in such a manner that it turns the latter to a position where the two shoulders abut, and the headlight is therefore normally held in straight-ahead position. The stem 12 is free to turn in a direction to separate the shoulders, and when it is thus turned, the beam of light is cast sidewise.

On the respective lamp stems 12, at the lower end thereof, are mounted and made fast pinions 18 which are in mesh with pinions 19 on one end of flexible shafts 20 having bevel pinions 21 on their other ends. It will therefore be seen that when the shafts 20 are operated, the lamp stems 12 are rotated to turn the headlights 10. The shafts 20 are supported on the frame 11 by brackets 22, and the axle 5 also carries suitable supports 23 for that end of the shaft carrying the pinion 21.

On the spindle connecting rod 8 are fastened two rack bars 24 which are in mesh with pinions 25 fast on short shafts 26 carried by the supports 23. On the shafts 26 are also fast bevel pinions 27 which are in mesh, respectively, with the pinions 21. Thus it will be seen that one of the racks 24 operates one of the lamp stems 12, and the other rack operates the other lamp stem.

As stated hereinbefore, the longitudinal movement of the spindle connecting rod 8 also involves a forward or rearward movement thereof, and for this reason the toothed portions of the racks 24 are curved to remain in mesh with the pinions during the entire stroke of the rod. However, when the rod 8 is moved in one direction, a rack corresponding to the headlight to be turned engages its pinion 25, whereas the other rack moves away from its pinion 25; and vice versa. The racks are so positioned that the headlight on the outer side of the curve is turned whereas the headlight on the inside of the curve remains stationary, casting a beam of light straight ahead. When the car is again traveling straight ahead, the headlight which was turned is swung back to its normal position by the spring 17 until it is stopped by the shoulders 15 and 16, it being understood that the spring was tensioned when the lamp stem 12 was rotated to turn the headlight.

The operation hereinbefore described is entirely automatic, and it is also reliable as the mechanism is devoid of complicated parts liable to get out of order. The drawing shows the gearing arranged to swing the headlights parallel to the front wheels of the car, but this is not necessary and the relative angular movement may be varied as desired.

I claim:—

1. The combination with the headlights and the spindle connecting rod of a motor vehicle; of rotatable stems carrying the headlights, racks on the spindle connecting rod, and pinions in mesh with the racks and having driving connections with the respective stems, said racks alternately coming out of mesh with the pinions when the spindle connecting rod is moved in opposite directions.

2. The combination with the headlights and the spindle connecting rod of a motor vehicle; of rotatable stems carrying the headlights, racks on the spindle connecting rod, pinions in mesh with the racks and having driving connections with the respective stems, said racks alternately coming out of mesh with the pinions when the spindle connecting rod is moved in opposite directions, supports for the stems, and coöperating stops on the supports and on the stems, said stops abutting when the headlights are in straight-ahead position.

3. The combination with the headlights and the spindle connecting rod of a motor vehicle; of rotatable stems carrying the headlights, racks on the spindle connecting rod, pinions in mesh with the racks and having driving connections with the respective stems, said racks alternately coming out of mesh with the pinions when the spindle connecting rod is moved in opposite directions, supports for the stems, coöperating stops on the supports and on the stems, said stems abutting when the headlights are in straight-ahead position, and resilient means opposing the turning movement of the stems in a direction to carry the headlights out of said position.

In testimony whereof I affix my signature.

ROBERTS E. EHRGOTT.